Jan. 31, 1967  R. SEAKAN  3,300,803
VEHICLE WASHING APPARATUS
Filed Sept. 8, 1965  7 Sheets-Sheet 1

INVENTOR.
RAYMOND SEAKAN
BY
D. Emmett Thompson
ATTORNEY.

INVENTOR.
RAYMOND SEAKAN
BY
D. Emmett Thompson
ATTORNEY.

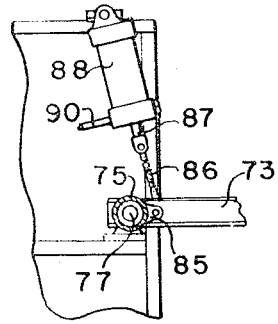
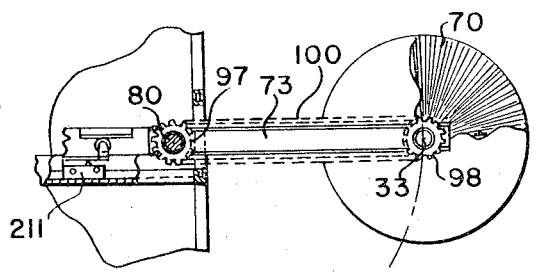
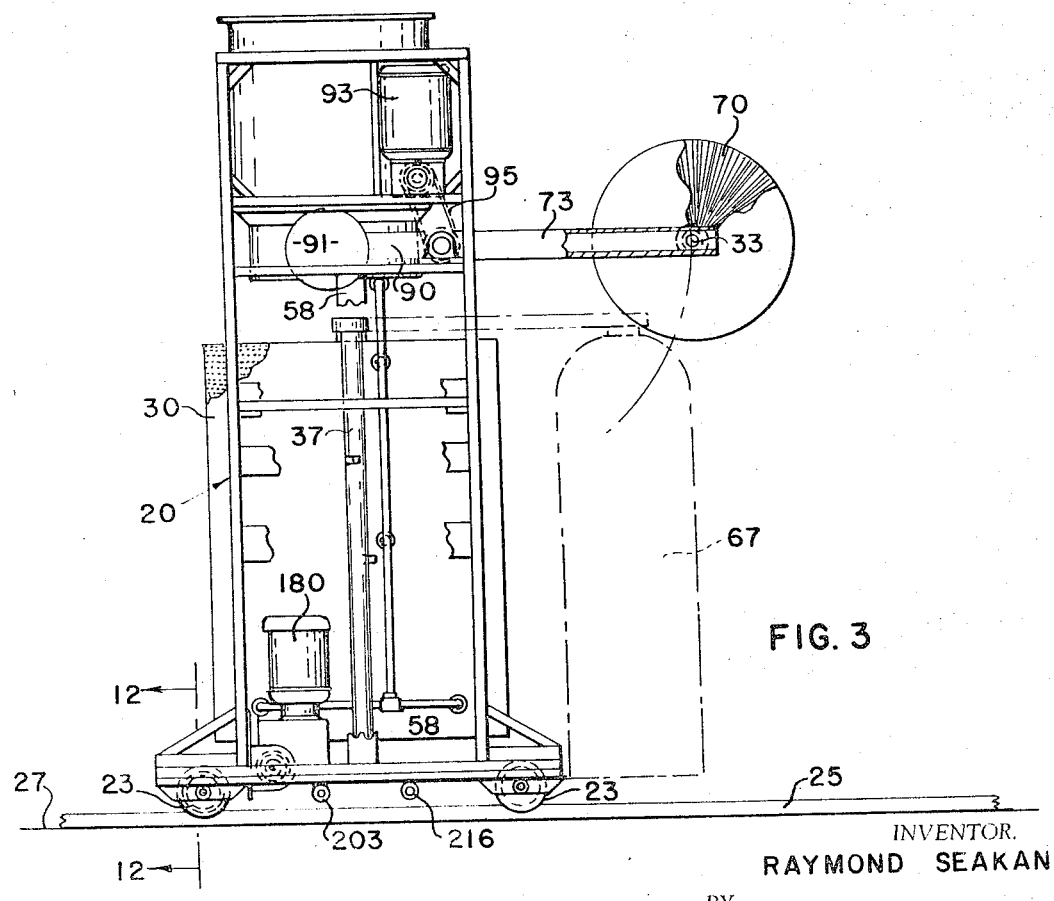

Jan. 31, 1967    R. SEAKAN    3,300,803
VEHICLE WASHING APPARATUS

Filed Sept. 8, 1965    7 Sheets-Sheet 4

INVENTOR.
RAYMOND SEAKAN
BY
D. Emmett Thompson
ATTORNEY.

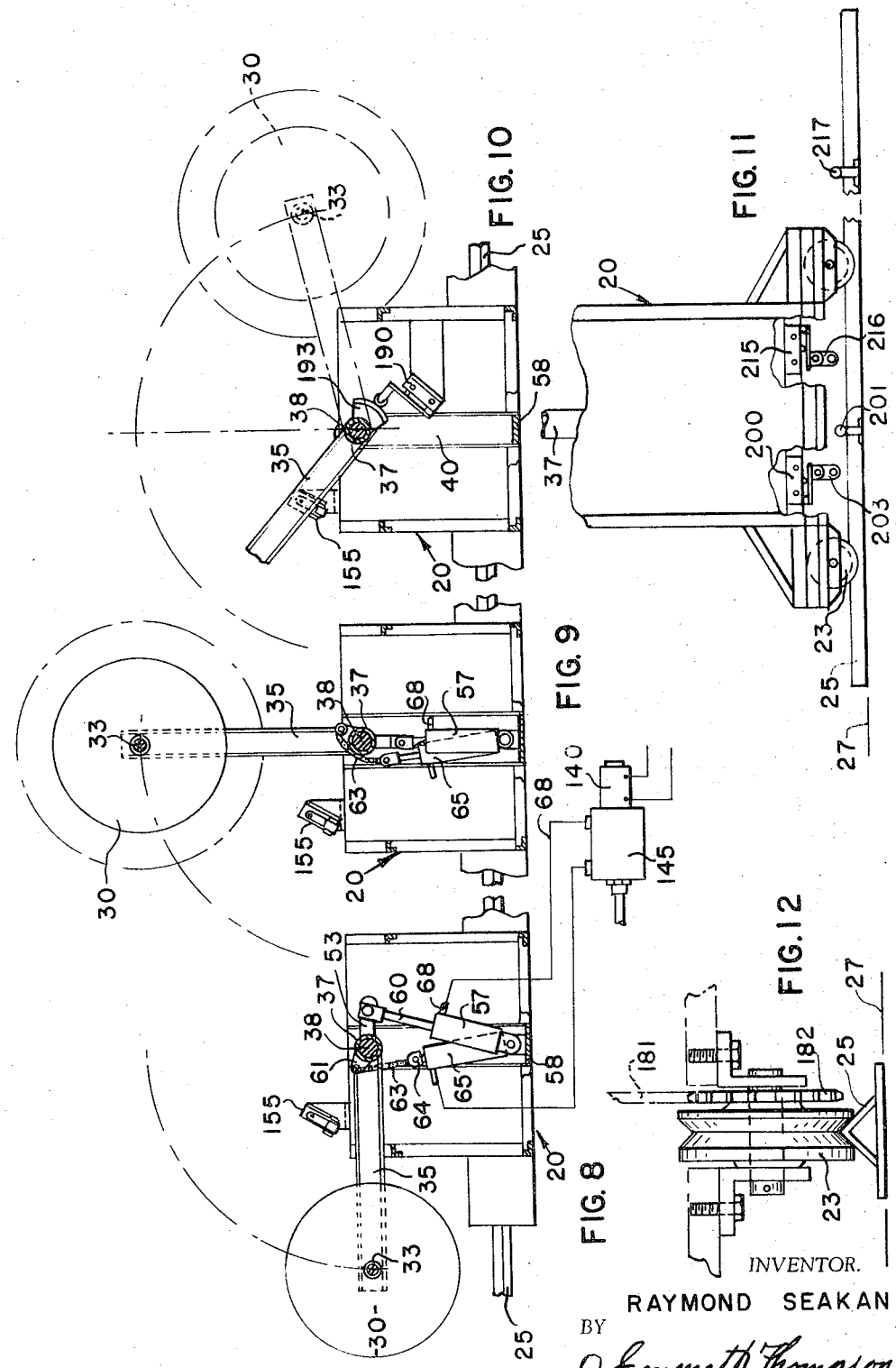

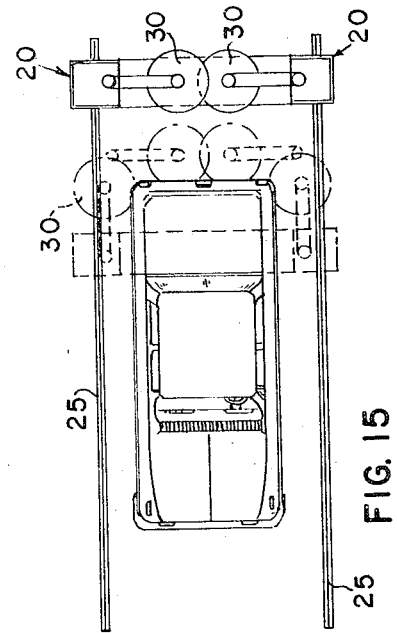
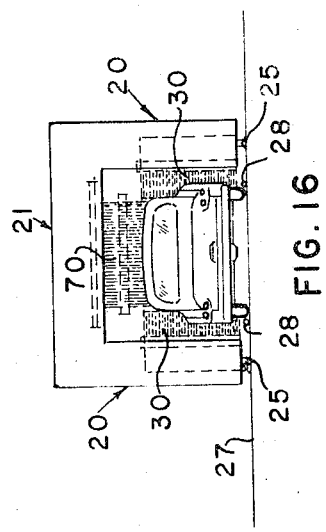
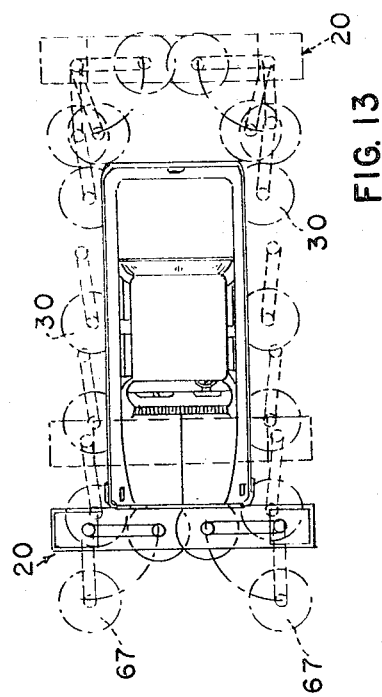
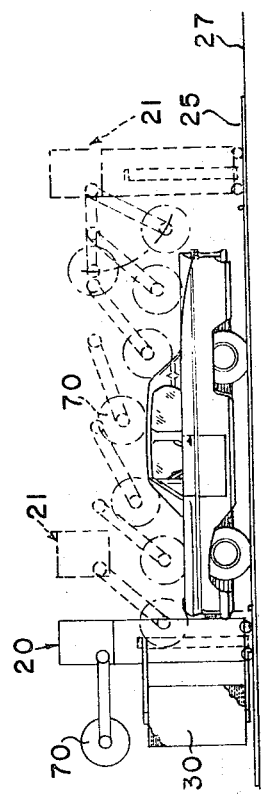

INVENTOR.
RAYMOND SEAKAN
BY
D. Emmett Thompson
ATTORNEY.

United States Patent Office 3,300,803
Patented Jan. 31, 1967

3,300,803
VEHICLE WASHING APPARATUS
Raymond Seakan, Utica, N.Y., assignor to Joseph T.
Hajec, Utica, N.Y.
Filed Sept. 8, 1965, Ser. No. 485,727
3 Claims. (Cl. 15—21)

This invention has to do with coin operated apparatus for automatically washing vehicles, particularly automobiles.

The invention has as an object a vehicle washing apparatus, the operation of which is initiated by a coin operated switch, the apparatus functioning to efficiently wash the entire area of the vertical and top surfaces of the automobile while the same is parked, and regardless of the size of the vehicle.

The invention consists in the novel features and in the combinations and constructions hereinafter set forth and claimed.

In describing this invention, reference is made to the accompanying drawings in which like characters designate corresponding parts in all the views.

In the drawings:

FIGURE 3 is a side elevational view, with parts of the frame broken away, the view looking to the right in FIGURE 1.

FIGURE 4 is a view taken on line 4—4, FIGURE 1.

FIGURE 5 is a view taken on line 5—5, FIGURE 1.

FIGURE 8 is a view taken on line 8—8, FIGURE 1, with the side brush in start position.

FIGURE 9 is a view, similar to FIGURE 8, with the side brush moved inwardly for engagement with the front end of the vehicle.

FIGURE 10 is a view taken on line 10—10, FIGURE 1.

FIGURE 11 is a side elevational view of the lower portion of the right side of the frame structure, as shown in FIGURE 1.

FIGURE 12 is a view taken on line 12—12, FIGURE 3.

FIGURE 13 is a top plan view illustrating the movement of the frame from the front of the vehicle to the rear thereof.

FIGURE 14 is a side elevational view looking to the left, FIGURE 1, and illustrating the positions of the top brush during movement of the frame from the front to the rear of the vehicle.

FIGURE 15 is a view illustrating the positions of the side brushes with the frame traveling toward and from the rear end of the vehicle.

FIGURE 16 is a view of the apparatus looking toward the rear end of the vehicle.

In general, the apparatus consists of an inverted U-shaped frame member movable along a pair of rails between which the vehicle to be washed is parked. There are a pair of brush supporting structures for supporting vertically disposed side brushes journalled for rotation about their vertical axes, and the apparatus includes means for automatically maintaining the side brushes under uniform constant pressure against the vertical surfaces of the vehicle, including the sides and the front and rear ends thereof. The apparatus also includes a top brush journalled for rotation about a horizontal axis and movable into engagement with the top surfaces of the car including the hood, roof and rear deck, for brushing the same during the washing operation.

Figure 1:
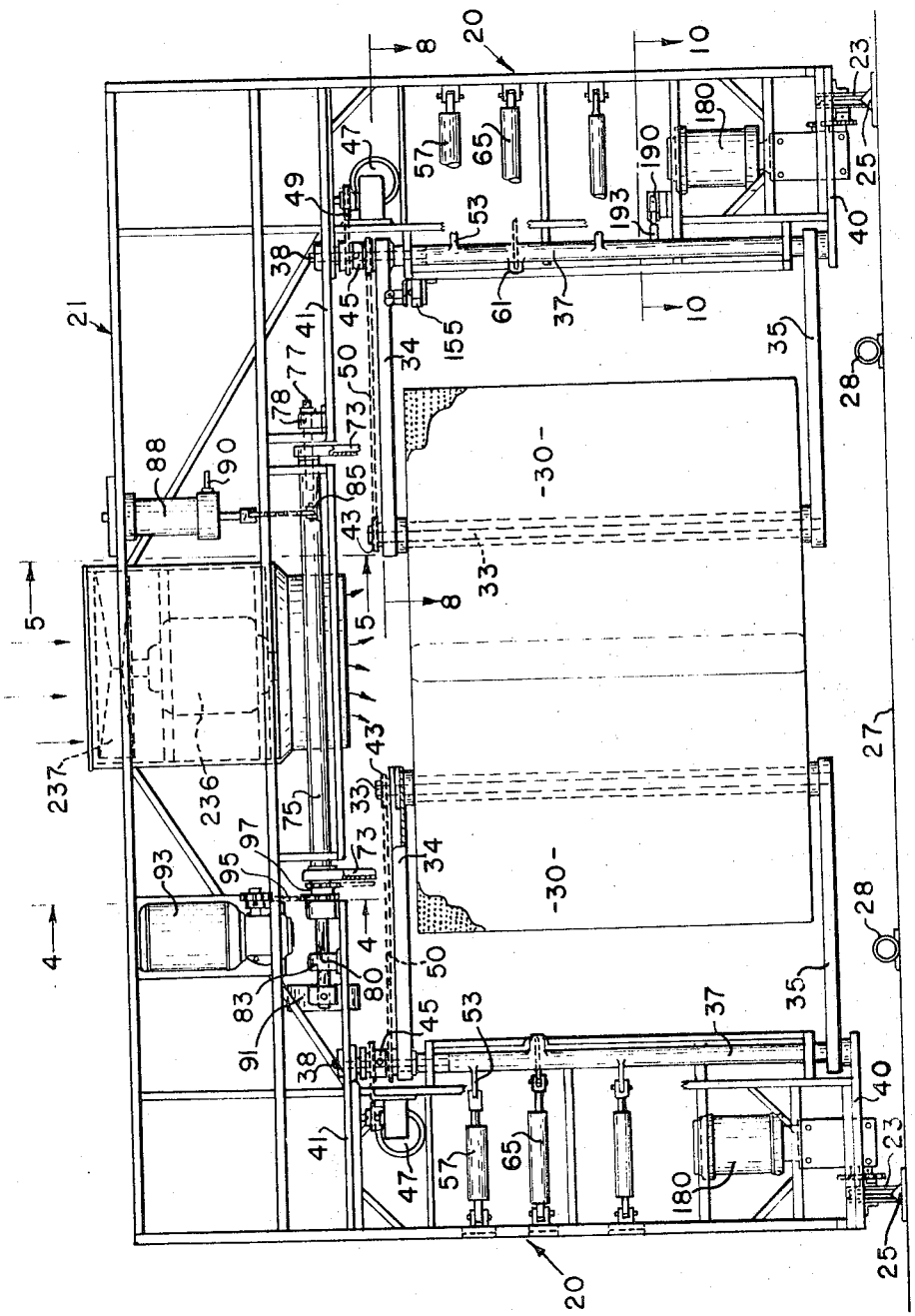
FIGURE 1 is a front elevational view of an apparatus embodying my invention, showing the side brushes moved inwardly for engaging the front end of the vehicle, and with the top brush removed.

Referring to FIGURE 1, the frame consists of vertical side, or leg, columns 20, and a transversely extending top structure 21. The columns and top structure are formed of structural steel members joined together, as by welding. Each leg portion of the frame includes rollers 23, journalled in the lower end portions thereof, for movement along rails 25, which extend in parallel relation, and are spaced apart a sufficient distance to permit the vehicle to be parked between the rails and, after the vehicle is washed, it may be driven from between the leg structures 20.

The rails 25 are fixedly secured to a floor surface 27. Guide rails 28 may be also affixed to the floor surface 27, as an aid in locating the parked vehicle substantially midway between the column structures 20.

The side brushes are indicated at 30. They are of cylindrical formation and formed of relatively long flexible bristles, preferably of nylon. Each of the brushes 30 is fixedly mounted on a shaft 33. These shafts are journalled at their upper ends in arms 34, and at their lower ends in arms 35. The opposite ends of the arms are fixedly attached to the upper and lower ends of tubular members 37, which are journalled on shafts 38. The lower ends of the shafts 38 are mounted in transversely extending members 40 at the lower end of each of the columns 20, see FIGURE 1. The upper ends of the shafts 38 are fixed in transversely extending members 41 constituting part of the upper frame cross structure 21. A sprocket 43 is affixed to the upper end of each of the shafts 33. A double sprocket 45 is journalled on each of the shafts 38, the sprockets being positioned immediately above the arms 34. A motor 47 is mounted in each leg structure 20. These motors are operatively connected to the double sprockets 45 by a chain 49 and, in turn, the double sprockets 45 are connected by chains 50 to the sprockets 43. With this arrangement, rotation is imparted to the vertically disposed side brushes 30.

An arm 53 is secured to each of the columns 37 and extends radially therefrom diametrically opposite to the arms 34, 35. An air cylinder 57 is pivotally mounted on a vertical channel member 58 in each leg structure 20, and has its piston rod 60, FIGURES 8 and 9, pivotally connected to the outer end of the arm 53.

An arm 61 is also attached to each of the members 37, and is connected by a chain 63 to the piston rod 64 of a cylinder 65, also mounted on channel 58.

Figure 2:
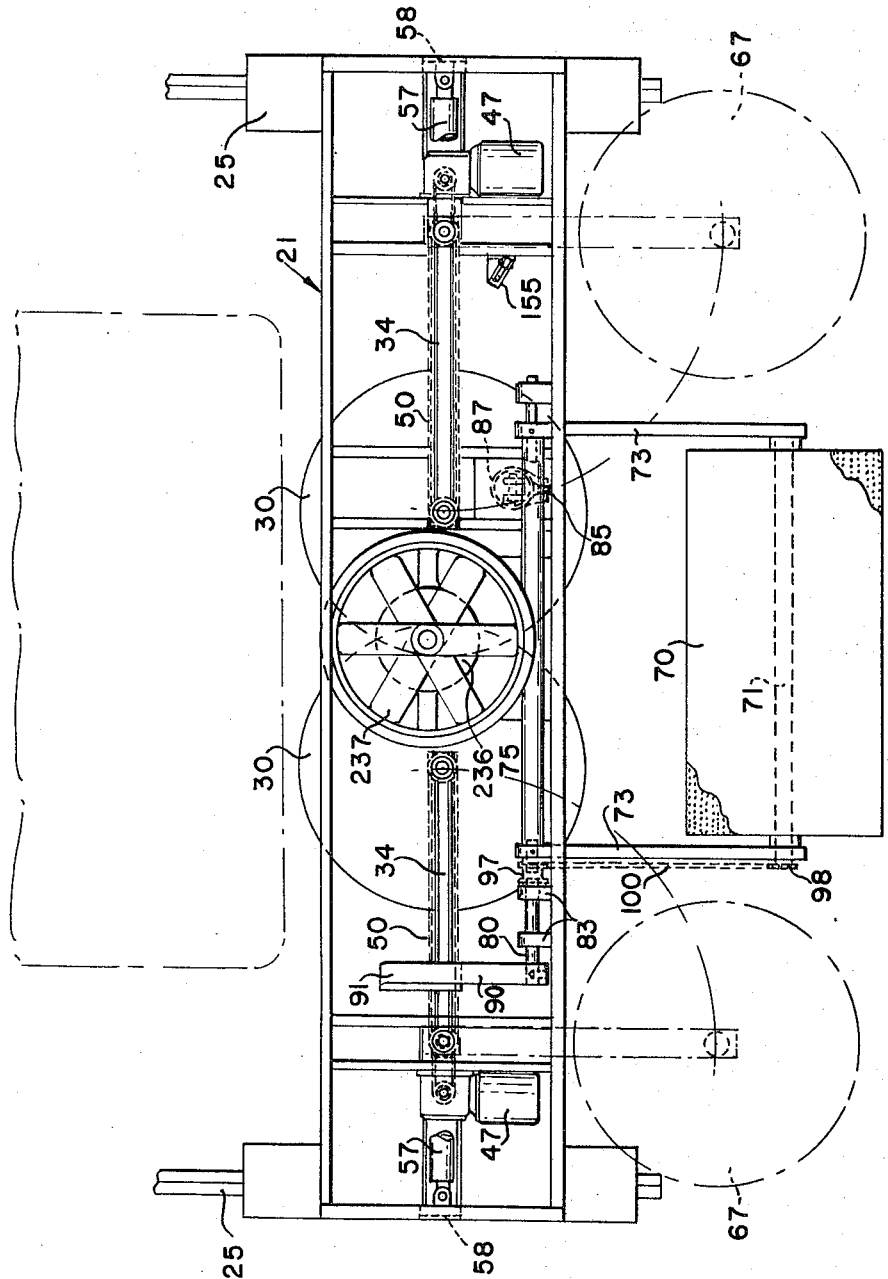
FIGURE 2 is a top plan view of the apparatus, as shown in FIGURE 1, and including the top brush, but with the drive motor therefor removed.

Normally, the brushes 30 are in a start position—that is, with the arms 34, 35, extending forwardly from the frame, as indicated in FIGURES 8 and 14, and in dotted outline at 67, in FIGURES 2, 3 and 13. At the start of the washing cycle, fluid is admitted through conduit 68, FIGURE 8, to the cylinders 57, causing the pistons thereof to move inwardly effecting movement of the arms 34, 35, about the axis of the shaft 38, to the position shown in full line, FIGURES 1, 3, 9 and 13, in which position the periphery of the brushes, when rotating, are in close adjacency and preferably overlap, as shown in the drawings. With the brushes 30 in this position, upon rearward movement of the frame, the brushes engage the front end of the vehicle and, as the frame continues rearwardly, the brushes are maintained against the vertical surfaces of the vehicle under a constant and uniform pressure which, as will be apparent, is determined by the pressure applied to the cylinders 57, and which can be varied by means of a conventional pressure regulator in the fluid supply line.

The top brush 70 is fixed on a shaft 71 journalled at its ends in arms 73, FIGURES 2, 4 and 5. The opposite ends of the arms 73 are fixed to a tubular member 75 which, at one end, is provided with a trunnion 77 journalled in a bearing 78 mounted in the head structure 21 of the frame. A trunnion shaft 80 is affixed in the opposite end of the tube 75, to the left FIGURE 1, and is journalled in bearings 83 mounted in the frame structure. An arm 85 is fixed to the tubular member 75, see FIGURES 1 and 5. The arm 85 is connected by a chain 86 to the piston rod 87 in cylinder 88 attached to the head structure 21. The arrangement is such that when fluid is admitted through conduit 90 to the lower end of the cylinder 88, counterclockwise rotation is imparted to the tube 75, FIGURE 5, to raise the top brush 70 to the up position, as shown in FIGURES 3, 4, 5 and 14, and is maintained in this position as long as fluid is supplied to the cylinder 88. An arm 90 is fixed to the trunnion shaft 80 and extends diametrically opposite from the arms 73, and is provided with a counterweight 91 to counterbalance the arm 73, and brush 70, to provide the proper pressure of the brush 70 against the top surfaces of the vehicle when fluid is exhausted from the cylinder 88.

Rotation is imparted to the brush 70 by a motor 93 shown in FIGURES 1 and 3, and omitted in FIGURE 2. The drive is effected by a chain 95 connecting the output shaft of the motor 93 to a double sprocket 97, journalled for free rotation on the shaft 80. The sprocket 97 is connected to a sprocket 98 fixed to the shaft 71, the connection being by way of chain 100.

Figure 17:
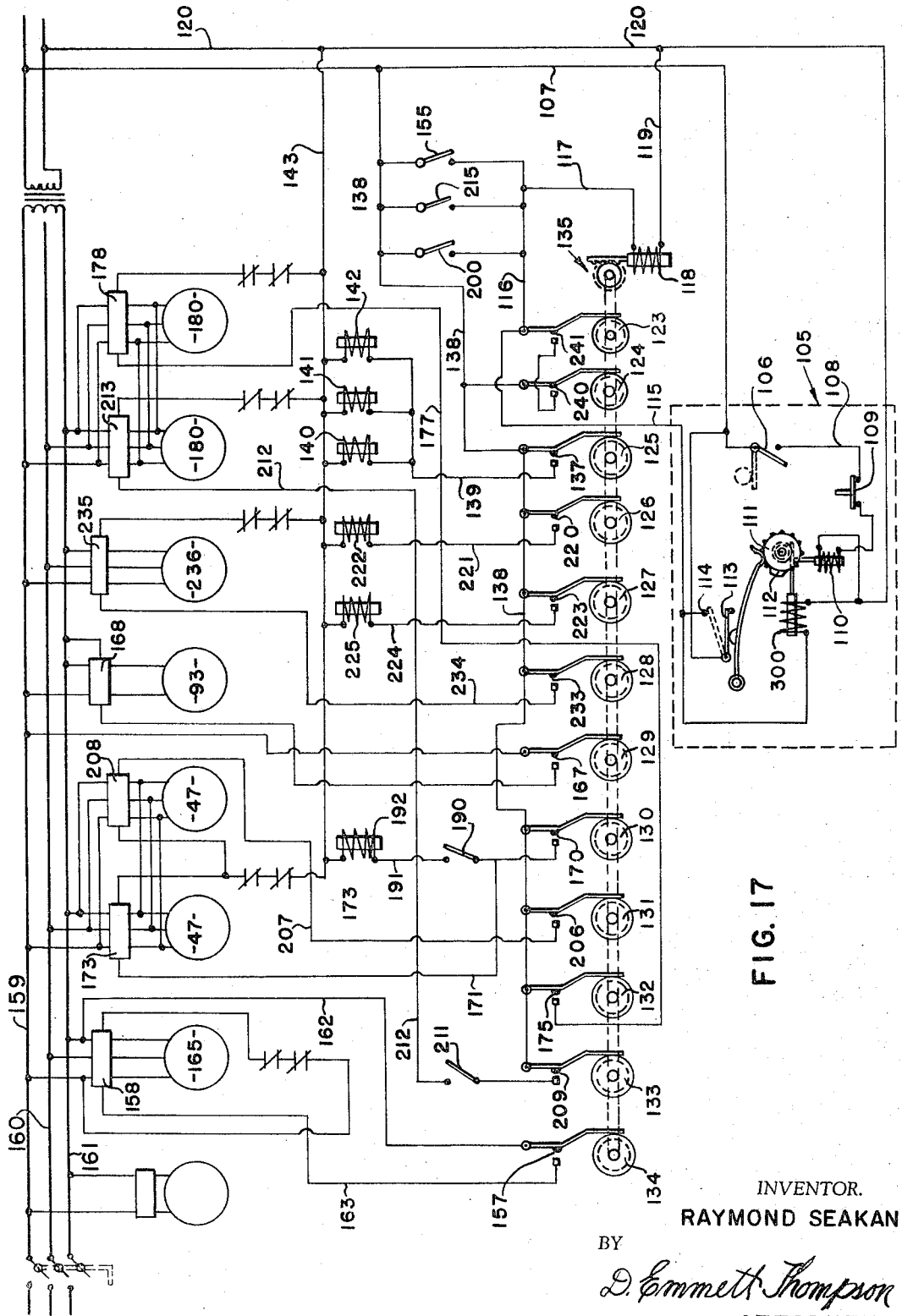
FIGURE 17 is a schematic wiring diagram of the control circuitry.

Referring now to the wiring diagram, FIGURE 17, 105 indicates a coin operated switch. Upon the deposit of each coin therein, the switch contact 106 is closed establishing a circuit from the single-phase supply side 107 through switch 106, wire 108, circuit breaker contacts 109 to coil 110 of a ratchet device operable each time coil 110 is engaged to impart rotation to a cam 111. Upon deposit of the second coin, the cam lobe 112 moves contact 113 into engagement with contact 114 establishing a circuit from wire 107 through wire 115, wire 116, wire 117 to solenoid 118, wire 119 to the opposite side 120 of the supply. Closed contacts 113, 114, also provide power to the release coil 300 to reset cam 112.

Figure 7:
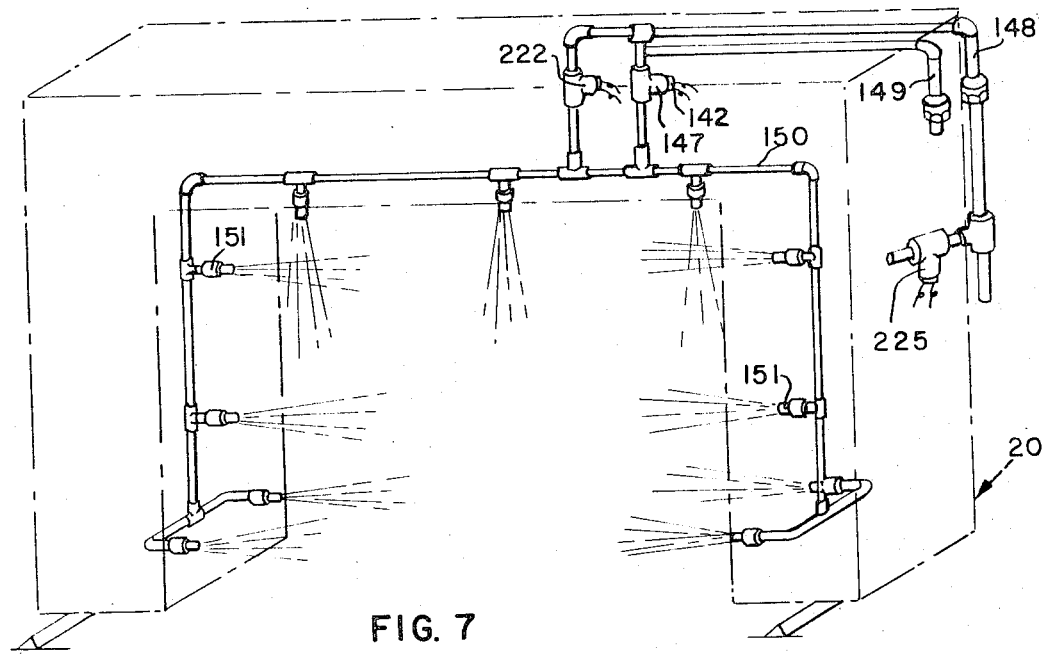
FIGURE 7 is a schematic view of the conduit system for directing cleaning and rinsing fluids against the vehicle.
Figure 6:
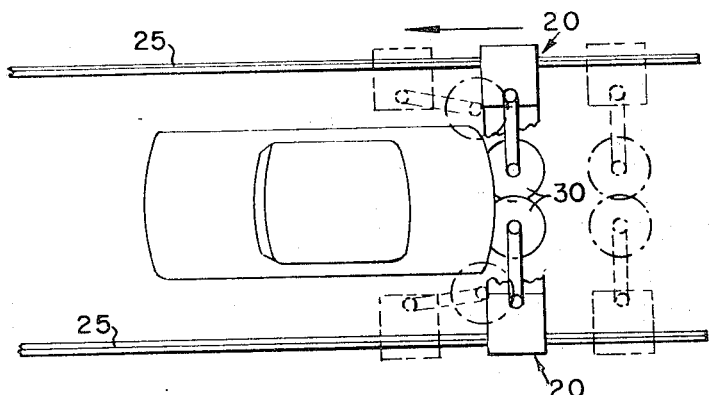
FIGURE 6 is a top plan schematic view illustrating positions of the frame and side brushes at the rear of the vehicle.

Energization of the solenoid 118 imparts rotation to a shaft 121 of a step switch provided with a plurality of cams 123–134. Upon the first operation of the ratchet mechanism 135, by energization of the solenoid 118, cam 125 closed contacts 137 establishing a circuit from the side 107, through wire 138, contacts 137, wire 139 to solenoids 140, 141, 142, the opposite sides of which are connected by wire 143 to the side 120. The solenoids 140, 141, operate valves 145, FIGURE 8, and when operated, supply fluid through the conduits 68 to the cylinders 57 effecting movement of the side brushes 30 from the start position, FIGURE 8, to the in position, FIGURE 9, in which position they engage the front end of the vehicle, as previously stated. Solenoid 142, when energized, opens valve 147 to supply water from the pipe 148 and soap, or other cleaning agent, from supply pipe 149 to the distribution pipe 150 for the direction of the cleaning solution through nozzles 151 against the vehicle, see FIGURE 7.

As the brushes 30 move from the start position, the arms 34 actuate a switch 155, FIGURE 1, establishing a circuit from wire 107, through wire 138, switch 155, wire 117 to solenoid 118 advancing the cam shaft 121 to the next position. In this position, switch contacts 137 remain closed and contacts 157 are closed, by cam 134, to close the contacts of motor starter 158, which is connected to the conductors 159, 160, 161 of the three-phase power supply, the energizing circuit being established from wire 161, wire 162, contacts 157, wire 163. The motor starter 158 provides power to motor 165, which operates the pump to supply water under pressure to conduit 148, FIGURE 7.

Cam 129, in this position, effects closing of contacts 167 to provide closing of the contacts of the motor starter 168 to provide power to the motor 93 to effect rotation of the top brush 70.

Cam 130, in this position, effects closing of the contacts 170, establishing a circuit from wire 171 to motor starter 173 to close the same to provide power to the brush motors 47, to effect rotation thereof in one direction.

Cam 132, in this position, effects closing of contacts 175 establishing a circuit from wire 138, wire 177 to motor starter 178 to close the contacts thereof, to supply power to the motor 180. Motor 180 is operatively connected to one of the frame track wheels 23 by a chain 181 trained about a sprocket 182, see FIGURE 12, attached to the wheel 23. The power supplied through the motor starter 178 operates the motor 180 to move the frame from left to right, FIGURES 13 and 14—that is, toward the rear end of the vehicle.

During this movement of the frame, the side brushes 30 are drawn outwardly across the front end of the vehicle, and downwardly along the sides thereof, the pressure of the brush against the vertical surfaces of the vehicle being determined by the air pressure supplied to the cylinders 57.

As the frame moves towards the rear end of the vehicle and the side brushes 30 are moved outwardly around the front corners of the vehicle, a switch 190 is actuated. It will be recalled that with the step switch shaft 121 in its present position, contacts 170 are closed, providing power from wire 138 to switch 190, and with the switch 190 closed, power is supplied to wire 191 to solenoid 192, the opposite side of which is connected to wire 143. Switch 190, FIGURE 10, is actuated by an arm 193 fixed to one of the columns 37, see FIGURES 1 and 10. Energization of the solenoid 192 closes a valve supplying air through conduit 90 to cylinder 88, FIGURES 1 and 5, and exhausts the air from the lower end of the cylinder to permit the top brush 70 to descend into engagement with the top surface of the hood of the vehicle, as indicated at 195, FIGURE 14. It will be recalled that the brush is revolving because of the energization of the drive motor 93 through the contacts 167 of the step switch.

The frame continues its movement toward the rear of the vehicle. When the side brushes 30 have reached the rear end of the vehicle, they are swung inwardly by the force exerted on the brushes by the cylinders 57, toward the position illustrated in full line in FIGURE 15. During the inward movement of the brushes the switch 155 is again operated, energizing the ratchet solenoid 118 to effect movement of the cam shaft 121 to the last position. In this position, contacts 137, 167, 170 and 157 open, removing the power supply from the top brush motor 93, also to the solenoid 192, whereby air pressure is again applied to the cylinder 88 to lift the top brush, and the motor starter 158 is deenergized to stop the pump motor 165. The opening of contacts 137 deenergizes the solenoids 140, 141, to actuate the air valves 145 to transfer air pressure from the cylinders 57 to the cylinders 65. This causes the brushes 30 to swing outwardly to the original start position, as indicated at 67 in FIGURE 13. Contacts 175 remain closed to continue power to the frame motor 180.

When the frame reaches the end of its rearward travel, a switch 200 is actuated by a stop 201 mounted on one of the rails 25, see FIGURE 11. The switch 200 is provided with a depending actuator 203 which, upon engagement with the stop 201, during movement of the frame rearwardly of the vehicle, causes the contacts of switch 200 to close. However, upon forward movement of the frame structure, the actuator 203 pivots in a counterclockwise direction, FIGURE 11, and there is no actuation of switch 200.

Closing of the switch 200 energizes the ratchet solenoid 118 to advance the cam shaft 121 to the next position. In this position, contacts 137 are closed, energizing the solenoids 140, 141, for actuation of the valves 145 to re-transfer the air pressure from the cylinders 65 to the cylinders 57 again causing the brushes 30 to move all the way into center position, as shown in full lines in FIGURE 15. Also, in this position of the step switch, contacts 206 are closed by cam 131 providing a circuit from the wire 138 to wire 207 to the motor starter 208. Activation of the starter 208 provides power to the motors 47 to effect reverse rotation thereof and, accordingly, reverse rotation of the brushes 30.

Contacts 209 are closed by cam 133, providing a circuit from wire 138, through switch 211, which is now closed because the top brush is in the upper position, wire 212 to the motor starter 213, which, now actuated, provides power to the frame motor 180 to effect rotation thereof in the opposite direction to move the frame structure toward the front end of the vehicle. Contacts 157 are again closed by cam 134 to energize the pump motor 165.

Forward motion of the frame brings the brushes 30, now in the "in" position, against the rear end of the vehicle. During the inward movement of the brushes 30, the switch 155 was again actuated to step the cam shaft 121 to the next position. The only change effected in this position is the opening of contacts 137 to apply air to the cylinders 57 to urge the brushes 30 against the rear end of the vehicle, the brushes having been moved into proximity therewith by the reverse movement of the frame. As will be apparent, the cylinders 57 maintain the brushes 30 in engagement with the sides of the vehicle as the frame moves forward.

When the side brushes 30 reach the forward end of the vehicle, they are swung around into "start" position, by the cylinders 65, and a switch 215 is actuated by its actuator 216, similar to the actuator 203, engaging a stop 217 mounted on the rail 25. Referring to the diagram, FIGURE 17, it will be apparent that switch 215, when closed, provides a circuit to the ratchet solenoid 118 to index the cam shaft 121 to the next position. In this position, cam 133 opens contacts 209 which, in turn, opens the contacts of the motor starter 178 to stop the forward movement of the frame.

Contacts 175 close to again energize the motor starter 178 to cause the frame to travel toward the rear of the vehicle. Contacts 157 close to provide power to the water pump motor 165. Contacts 220 close to provide a circuit from wire 138 to wire 221 to the solenoid 222 to provide clear rinse water to the pipe 150. If a wax finish is desirable on the vehicle, contacts 223 also close to provide a circuit through wire 224 to the solenoid 225, which admits a wax solution to the pipe 148. It will be observed in this second rearward movement of the frame, only rinse water is applied without the side or top brushes contacting the vehicle.

When the frame reaches the end of its rearward travel and switch 200 is operated, the cam shaft 121 is again indexed, and in this position contacts 175 are open, and contacts 209 are closed, effecting reversal of the frame motor 180, as previously explained. During movement of the frame from the rear end of the vehicle toward the front, the switch 211 is always closed. It is a limit switch, FIGURE 4, which is closed when the top brush 70 is in up position. In this position of the cam shaft, contacts 220 remain closed to apply the rinse water. Contacts 223 are closed, if the wax finish is being applied and, of course, contacts 157 remain closed to effect operation of the pump motor 165.

The frame continues forwardly until the forward stop switch 215 is energized again effecting reversal of the frame driving motor 180. In this position of the step switch, contacts 220, 223, and 157 are open, shutting off water dispersion against the vehicle.

In this position of the step switch, contacts 223 are closed, providing a circuit from the wire 138, through wire 234, to the motor starter 235, effecting the closing of the contacts thereof to energize a motor 236, see FIGURE 1, operating a fan 237 mounted centrally in the top structure 21 and being operable to blow air downwardly over the vehicle. Contacts 175 open, and contacts 209 close, to effect reversal of the frame drive motor 180 to effect movement of the frame toward the rear of the vehicle. When the frame reaches the end of its travel at the rear of the vehicle, the switch 200 is again operated to advance the stepping switch to open contacts 233, stopping the blower motor 236, and contacts 209 open to disconnect the frame motor 180 from the power supply.

In this last position of the cycle, cams 123 and 124 close contacts 240, 241, for advancing the cam shaft through unused positions to the neutral or starting position.

What I claim is:

1. A vehicle washing apparatus including a pair of rails extending in parallel spaced relation and being spaced apart to provide for the parking of the vehicle therebetween, a frame having spaced apart vertical leg columns movable along said rails, a brush carrier pivotally mounted on each of said leg columns, a vertical brush journalled for rotation about a vertical axis in each of said carriers, said carriers being movable about their pivots to position said brushes in close adjacency at the ends of the vehicle for brushing the same, power means operable to effect rotation of said vertical brushes about their vertical axis, a second power means for effecting movement of said frame along said rails from one end of the vehicle to the opposite end thereof and return movement to the first end of the vehicle, said carriers and vertical brushes trailing said frame during movement thereof, and being movable outwardly around the end corners of the vehicle during movement of the frame on said rails, a top brush for brushing the top surfaces of the vehicle, said top brush being normally positioned above the top surfaces of the vehicle, means responsive to movement of said vertical brushes about the end corners of the vehicle at the one end thereof to cause said top brush to move downwardly in engagement with the top surface of the vehicle, pressure means operable to maintain said vertical brushes against the vertical surfaces of the vehicle under a constant uniform pressure during movement of said frame along said rails, and means responsive upon inward movement of said brushes at the opposite end of the vehicle to effect upward movement of said top brush out of engagement with the top surfaces of the vehicle.

2. A vehicle washing apparatus including a pair of fixed rails extending in parallel relation and being spaced apart to provide for the parking of a vehicle therebetween, a frame having spaced apart vertical leg columns movable along said rails in opposite directions lengthwise of the vehicle, a reversible power driving means for imparting such movement to said frame, a brush carrier pivotally mounted on each leg column, a vertically disposed brush journalled for rotation about a vertical axis in each of said carriers, said vertical brushes being normally in a start position forwardly of one end of the parked vehicle and spaced apart a sufficient distance to permit passage of the vehicle between said brushes without the latter engaging the vehicle, means operable upon initial movement of said frame toward said one end of the vehicle to move said carriers about their pivots to position said brushes in close adjacency at said one end of the vehicle for brushing the same, power means operable to effect rotation of said vertical brushes about their vertical axes, said carriers and vertical brushes trailing said frame and being movable outwardly around the end corners of the vehicle at each end thereof during movement of the frame along said rails for brushing the sides of the vehicle, means operable to maintain said vertical brushes against the vertical surfaces of the vehicle under a constant uniform pressure during movement of said frame in both directions along said rails, and to cause inward movement of said vertical brushes as the frame passes the opposite end of the vehicle, means operable to effect reversal of said power driving means for return movement of said frame to said first end of the vehicle, and upon return movement of said frame beyond said first end of the vehicle to return said vertical brushes to their start position, and means for directing cleansing fluid on the vehicle during at least part of the movement of said frame.

3. A vehicle washing apparatus including a pair of fixed rails extending in parallel relation and being spaced apart to provide for the parking of a vehicle therebetween, a frame having spaced apart vertical leg columns movable along said rails in opposite directions lengthwise of the vehicle, a reversible power driving means for imparting such movement to said frame, a brush carrier pivotally mounted on each leg column, a vertically disposed brush journalled for rotation about a vertical axis in each of said carriers, said vertical brushes being normally in a start position forwardly of one end of the parked vehicle and spaced apart a sufficient distance to permit passage of the vehicle between said brushes without the latter engaging the vehicle, means operable upon initial movement of said frame toward said one end of the vehicle to move said carriers about their pivots to position said brushes in close adjacency at said one end of the vehicle for brushing the same, power means operable to effect rotation of said vertical brushes about their vertical axes, said carriers and vertical brushes trailing said frame and being movable outwardly around the end corners of the vehicle at each end thereof during movement of the frame along said rails for brushing the sides of the vehicle, a top brush for brushing the top surfaces of the vehicle, said top brush being normally positioned above the top surfaces of the vehicle, means responsive to movement of said vertical brushes about the end corners of the vehicle at said one end thereof to cause said top brush to move downwardly in engagement with the top surfaces of the vehicle, pressure means operable to maintain said vertical brushes against the vertical side surfaces of the vehicle under a constant uniform pressure during movement of said frame along said rails, and to cause inward movement of said vertical brushes at the opposite end of the vehicle, means operable in response to inward movement of said vertical brushes at said opposite end of the vehicle to effect upward movement of said top brush and to effect reversal of said power driving means for return movement of said frame to said first end of the vehicle, and upon return movement of said frame beyond said first end of the vehicle to return said vertical brushes to said start position, and means for directing cleansing fluid on the vehicle during at least part of the movement of said frame.

References Cited by the Examiner
UNITED STATES PATENTS 3,187,359  6/1965  Takeuchi.
3,233,264  2/1966  Nickl et al.
3,238,551  3/1966  Cirono et al.

FOREIGN PATENTS 1,236,015  6/1960  France.

CHARLES A. WILLMUTH, *Primary Examiner.*
E. L. ROBERTS, *Assistant Examiner.*